(12) United States Patent
Negishi et al.

(10) Patent No.: US 10,989,249 B2
(45) Date of Patent: Apr. 27, 2021

(54) SLIDING COMPONENT

(71) Applicant: EAGLE INDUSTRY CO., LTD., Tokyo (JP)

(72) Inventors: Yuta Negishi, Tokyo (JP); Hideyuki Inoue, Tokyo (JP); Takeshi Hosoe, Tokyo (JP); Yuichiro Tokunaga, Tokyo (JP)

(73) Assignee: EAGLE INDUSTRY CO., LTD.

( * ) Notice: Subject to any disclaimer, the term of this patent is extended or adjusted under 35 U.S.C. 154(b) by 71 days.

(21) Appl. No.: 16/347,644

(22) PCT Filed: Nov. 6, 2017

(86) PCT No.: PCT/JP2017/039897
§ 371 (c)(1),
(2) Date: May 6, 2019

(87) PCT Pub. No.: WO2018/088350
PCT Pub. Date: May 17, 2018

(65) Prior Publication Data
US 2019/0331162 A1    Oct. 31, 2019

(30) Foreign Application Priority Data
Nov. 14, 2016    (JP) .............................. JP2016-221317

(51) Int. Cl.
*F16C 33/10*    (2006.01)
*F16C 17/10*    (2006.01)

(52) U.S. Cl.
CPC .......... *F16C 17/102* (2013.01); *F16C 33/107* (2013.01)

(58) Field of Classification Search
CPC ...... F16J 15/34; F16J 15/3404; F16J 15/3408; F16J 15/3412; F16J 15/3416;
(Continued)

(56) References Cited

U.S. PATENT DOCUMENTS

2013/0209011 A1    8/2013 Tokunaga
2015/0184752 A1*   7/2015 Itadani ................. F16J 15/3412
                                                        277/400

(Continued)

FOREIGN PATENT DOCUMENTS

WO    WO-2012-046749 A1    4/2012
WO    WO-2012046749 A1 *   4/2012    ........... F01D 25/168
(Continued)

*Primary Examiner* — Gilbert Y Lee
(74) *Attorney, Agent, or Firm* — Harness, Dickey & Pierce, P.L.C.

(57) ABSTRACT

A sliding component is provided. At least one sliding face of sliding faces sliding relatively to each other of a pair of sliding parts of annular shapes is provided with positive pressure generation mechanisms with positive pressure generation grooves and negative pressure generation mechanisms with negative pressure generation grooves. The positive pressure generation grooves and the negative pressure generation grooves are separated from the opposite-to-sealed-fluid side by a land. Deep grooves deeper than the groove depth of the positive pressure generation grooves and the negative pressure generation grooves are located at least on the opposite-to-sealed-fluid side of the positive pressure generation grooves and the negative pressure generation grooves. The deep grooves are provided in such a manner as to communicate at least with the sealed fluid side.

4 Claims, 7 Drawing Sheets

(58) Field of Classification Search
CPC .... F16J 15/342; F16J 15/3428; F16C 17/102; F16C 33/107
See application file for complete search history.

(56) References Cited

U.S. PATENT DOCUMENTS

| | | |
|---|---|---|
| 2015/0377297 A1 | 12/2015 | Tokunaga et al. |
| 2016/0047476 A1 | 2/2016 | Kiernan |
| 2017/0067510 A1 | 3/2017 | Hosoe et al. |
| 2017/0241549 A1 | 8/2017 | Itadani et al. |
| 2018/0187785 A1* | 7/2018 | Katori .................. F16J 15/3424 |
| 2019/0285115 A1* | 9/2019 | Negishi ................ F16C 33/741 |
| 2020/0182356 A1* | 6/2020 | Itadani .................... C23C 16/27 |

FOREIGN PATENT DOCUMENTS

| | | |
|---|---|---|
| WO | WO-2014-148316 A1 | 9/2014 |
| WO | WO-2015-125950 A1 | 8/2015 |
| WO | WO-2015199172 A1 * | 12/2015 ........... F16J 15/3412 |
| WO | WO-2016-072325 A1 | 5/2016 |

\* cited by examiner

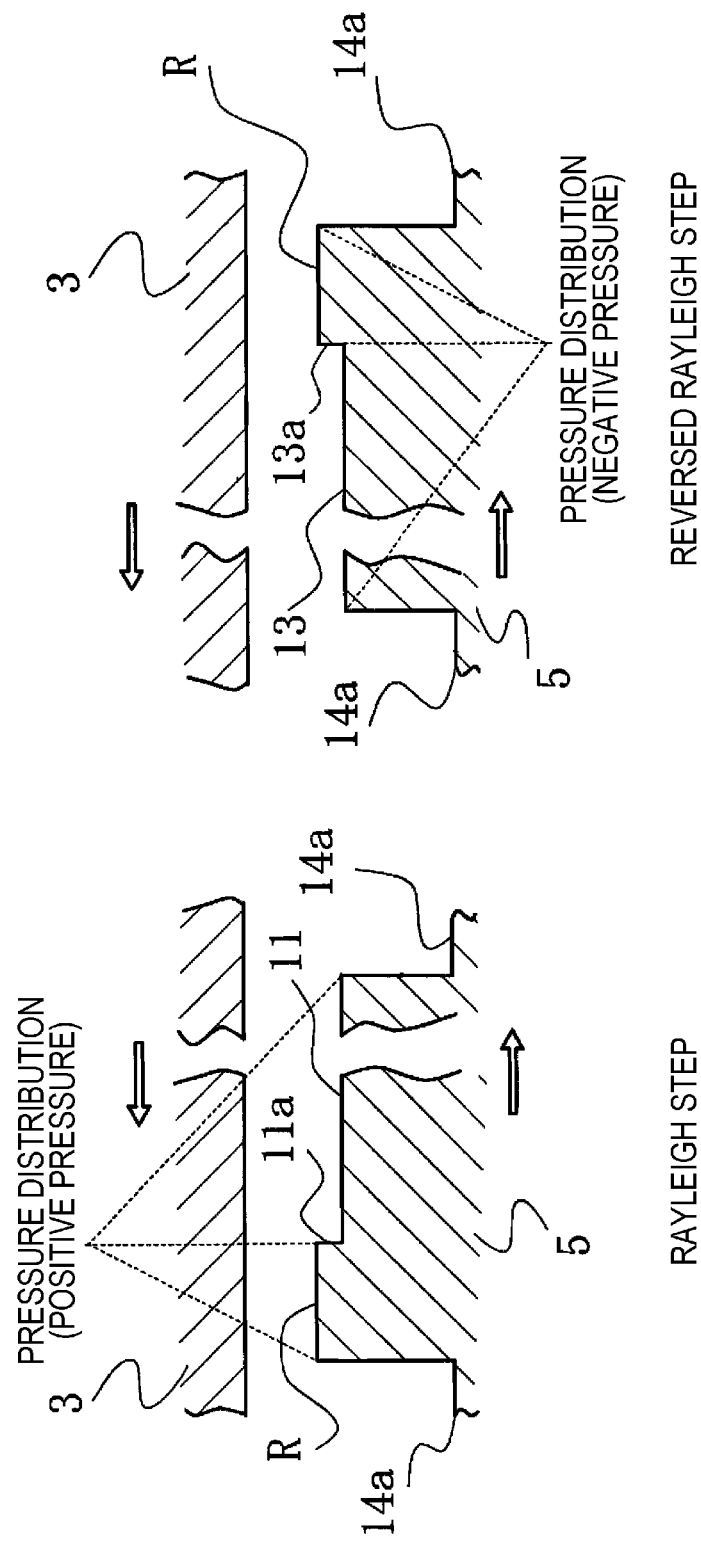

RELATIONSHIP BETWEEN NUMBER OF REVOLUTIONS AND MINIMUM LIQUID FILM

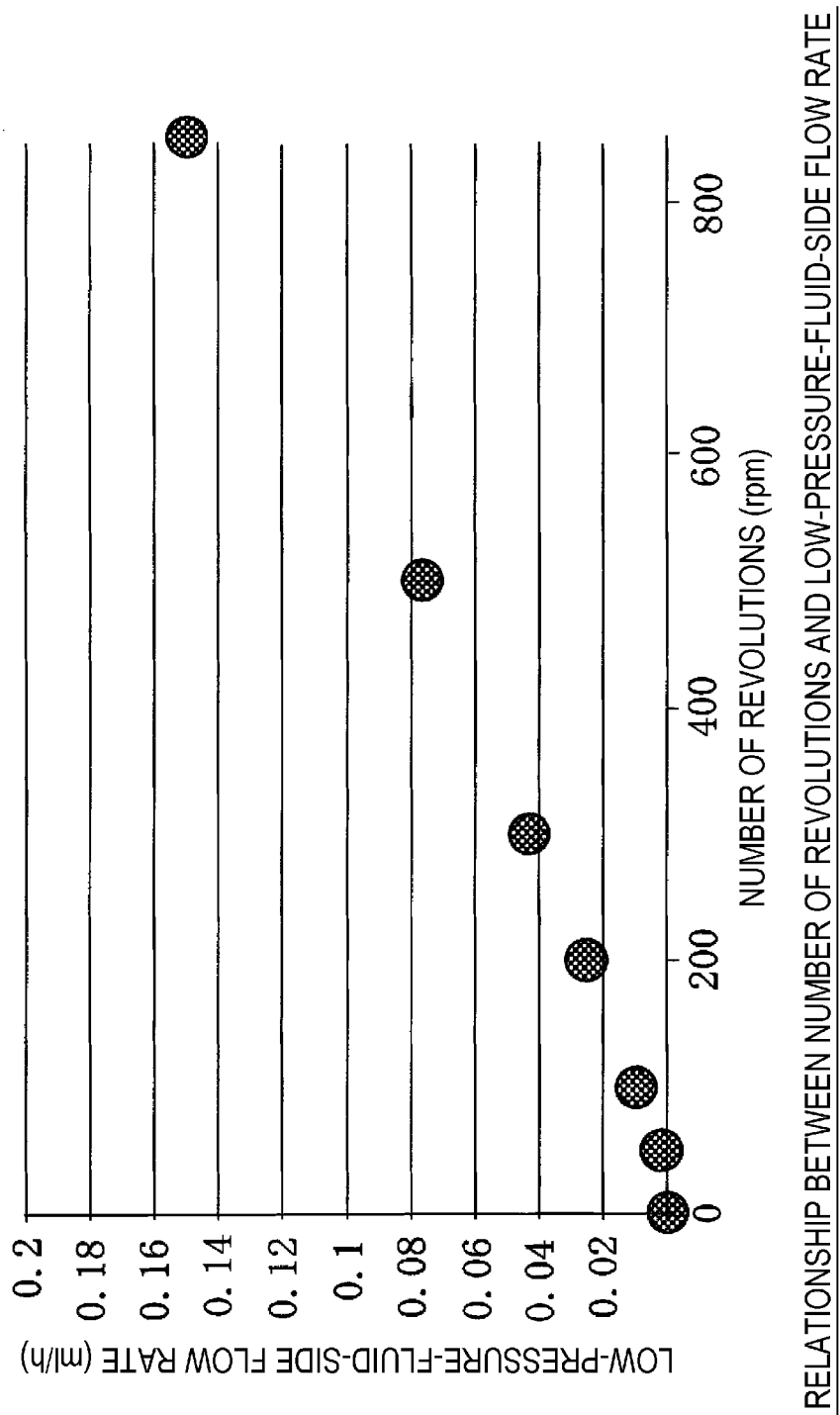

SLIDING COMPONENT

CROSS REFERENCE TO RELATED APPLICATIONS

This application is a U.S. National Stage Application of International Application No. PCT/JP2017/039897, filed on Nov. 6, 2017, and published in Japanese as WO 2018/088350 on May 17, 2018 and claims priority to Japanese Application No. 2016-221317, filed on Nov. 14, 2016. The entire disclosures of the above applications are incorporated herein by reference.

BACKGROUND

Technical Field

The present invention relates to sliding components suitable, for example, as mechanical seals, bearings, and other sliding units. More particularly, the present invention relates to sliding components such as seal rings or bearings that require friction reduction by fluid intervention between sliding faces, and prevention of fluid leakage from the sliding faces.

Related Art

A mechanical seal, an example of a sliding component, is evaluated for its performance based on the leakage rate, wear rate, and torque. Conventional arts have optimized the sliding materials and the sliding face roughness of mechanical seals, thereby enhancing performance and achieving low leakage, long life, and low torque. However, due to growing awareness of environmental problems in recent years, a further improvement in the performance of mechanical seals has been required, and technical development beyond the limits of the conventional arts has been necessary.

Under these circumstances, the present applicant has filed a patent application for an invention of a sliding component that does not leak during rest, and operates with fluid lubrication while preventing leakage during rotation including the early stages of rotation, to be able to achieve both sealing and lubrication (hereinafter, referred to as the "conventional art." See WO 2012/046749 A1).

As an embodiment of the conventional art, a sliding part as shown in FIGS. 7A and 7B is proposed in which the outer peripheral side of a sliding part 31 of an annular shape is the high-pressure fluid side, and the inner peripheral side is the low-pressure fluid side, grooves 35 of Rayleigh step mechanisms 33 constituting positive pressure generation mechanisms are provided on the high-pressure side of a sliding face 32, and grooves 36 of reversed Rayleigh step mechanisms 34 constituting negative pressure generation mechanisms on the low-pressure side, pressure release grooves 45 are provided between the grooves 35 and the grooves 36, and the grooves 35, the pressure release grooves 45, and the grooves 36 communicate with the high-pressure fluid side through radius-direction grooves 37 and are separated from the low-pressure fluid side by a sealing face 38. In the sliding part, each radius-direction groove 37 is of a shape inclined from the inner peripheral side communicating with the groove 36 to the outer peripheral side in a rotational direction of a mating sliding face. In this embodiment, fluid on the sliding face 32 is discharged in a direction shown by an arrow 46. The groove depth of the grooves 35 and the grooves 36 is about some micrometers, and the groove depth of the radius-direction grooves 37 and the pressure release grooves 45 is about some tens of micrometers. The groove depth of the radius-direction grooves 37 and the pressure release grooves 45 is set sufficiently deeper than the groove depth of the grooves 35 and the grooves 36.

The above conventional art is excellent in that it does not leak during rest, and operates with fluid lubrication while preventing leakage during rotation including the early stages of rotation, to be able to achieve both sealing and lubrication. However, the present inventors have found that since the pressure release grooves 45 are provided between the grooves 35 of the positive pressure generation mechanisms and the grooves 36 of the negative pressure generation mechanisms, and the grooves 36 of the negative pressure generation mechanisms are provided on the low-pressure fluid side, which is the leakage side, fluid on the high-pressure fluid side cannot be introduced to the low-pressure fluid side of the sliding face 32, which can cause a liquid film to run out on the sliding face on the low-pressure fluid side, causing wear, burn-damage, or the like due to friction heating between the sliding faces, and deteriorating the functions of the mechanical seal.

The present invention has been made to solve the problem of the conventional art while making use of its advantages. It is an object of the present invention to provide a sliding component that takes in fluid actively to the entire sliding face to prevent wear, burn-damage, and the like due to friction heating between sliding faces while preventing leakage, thereby being able to maintain the sealing function of the sliding faces for a long time, while satisfying conflicting conditions of sealing and lubrication.

SUMMARY OF THE INVENTION

To attain the above object, a sliding component according to a first aspect of the present invention includes a pair of sliding parts of annular shapes, the sliding parts having respective sliding faces sliding relatively to each other, at least one of the sliding faces being provided with a positive pressure generation mechanism with a positive pressure generation groove and a negative pressure generation mechanism with a negative pressure generation groove, the positive pressure generation groove and the negative pressure generation groove being separated from an opposite-to-sealed-fluid side by a land. The sliding component is characterized in that a deep groove deeper than a groove depth of the positive pressure generation groove and the negative pressure generation groove is located at least on the opposite-to-sealed-fluid side of the positive pressure generation groove and the negative pressure generation groove, and the deep groove is provided in such a manner as to communicate at least with a sealed fluid side.

According to this aspect, fluid is actively take into the entire sliding face to prevent a liquid film between the sliding faces from running out, and improve low torque, low wear, and resistance to the adhesion of sealed fluid molten material while preventing leakage. Consequently, a sliding component that can maintain the sealing function of the sliding faces for a long time can be provided.

According to a second aspect of the present invention, the sliding component in the first aspect is characterized in that the deep groove includes a radius-direction groove and circumferential grooves.

According to this aspect, the positive pressure generation groove and the negative pressure generation groove can be arranged efficiently on the sliding face, and fluid can be effectively taken into the entire sliding face.

According to a third aspect of the present invention, the sliding component in the first aspect is characterized in that the positive pressure generation groove and the negative pressure generation groove are arranged on opposite sides of the radius-direction groove circumferentially intermittently to extend in an arc shape, and the circumferential grooves are arranged circumferentially continuously through the radius-direction groove.

According to this aspect, when a plurality of positive pressure generation grooves and a plurality of negative pressure generation grooves are arranged, the positive pressure generation grooves and the negative pressure generation grooves can be arranged efficiently on the sliding face, and fluid can be effectively taken into the entire sliding face.

According to a fourth aspect of the present invention, the sliding component in any one of the first to third aspects is characterized in that the positive pressure generation groove is formed of a Rayleigh step groove, and the negative pressure generation groove is formed of a reversed Rayleigh step groove or a pumping groove.

According to this aspect, positive pressure and negative pressure can be generated efficiently at the sliding face.

According to a fifth aspect of the present invention, the sliding component in any one of the first to fourth aspects is characterized in that the positive pressure generation groove or the negative pressure generation groove is radially spaced in a plurality of rows, and the circumferential grooves are arranged on the opposite-to-sealed-fluid side of the positive pressure generation groove and the negative pressure generation groove, and in a radial direction space between the positive pressure generation groove and the negative pressure generation groove.

According to this aspect, positive pressure and negative pressure can be generated effectively at the entire sliding face, and fluid can be effectively taken into the entire sliding face.

Effect of the Invention

The present invention achieves the following outstanding effects.
(1) The deep groove deeper than the groove depth of the positive pressure generation groove and the negative pressure generation groove is located at least on the opposite-to-sealed-fluid side of the positive pressure generation groove and the negative pressure generation groove, and the deep groove is provided in such a manner as to communicate at least with the sealed fluid side, so that fluid is actively take into the entire sliding face to prevent a liquid film between the sliding faces from running out, and improve low torque, low wear, and resistance to the adhesion of sealed fluid molten material while preventing leakage. Consequently, a sliding component that can maintain the sealing function of the sliding faces for a long time can be provided.
(2) The deep groove includes the radius-direction groove and the circumferential grooves, so that the positive pressure generation groove and the negative pressure generation groove can be arranged efficiently on the sliding face, and fluid can be effectively taken into the entire sliding face.
(3) The positive pressure generation groove and the negative pressure generation groove are arranged on opposite sides of the radius-direction groove circumferentially intermittently to extend in an arc shape, and the circumferential grooves are arranged circumferentially continuously through the radius-direction groove. Consequently, when a plurality of positive pressure generation grooves and a plurality of negative pressure generation grooves are arranged, the positive pressure generation grooves and the negative pressure generation grooves can be arranged efficiently on the sliding face, and fluid can be effectively taken into the entire sliding face.
(4) The positive pressure generation groove is formed of a Rayleigh step groove, and the negative pressure generation groove is formed of a reversed Rayleigh step groove or a pumping groove, so that positive pressure and negative pressure can be generated efficiently at the sliding face.
(5) The positive pressure generation groove or the negative pressure generation groove is radially spaced in a plurality of rows, and the circumferential grooves are arranged on the opposite-to-sealed-fluid side of the positive pressure generation groove and the negative pressure generation groove, and in the radial direction space between the positive pressure generation groove and the negative pressure generation groove, so that positive pressure and negative pressure can be generated effectively at the entire sliding face, and fluid can be effectively taken into the entire sliding face.

BRIEF DESCRIPTION OF THE DRAWINGS

FIG. 4A shows a Rayleigh step mechanism for explaining a positive pressure generation mechanism formed of a Rayleigh step mechanism or the like.

FIG. 4B shows a reversed Rayleigh step mechanism for explaining a negative pressure generation mechanism formed of a reversed Rayleigh step mechanism or the like.

FIG. 6 is a graph showing the relationship between the number of revolutions and the flow rate on the inner peripheral side of the sliding face in the sliding component according to the first embodiment of the present invention.

DESCRIPTION OF EMBODIMENTS

Hereinafter with reference to the drawings, a mode for carrying out this invention will be described illustratively based on an embodiment. However, the dimensions, materials, shapes, relative arrangements, and the like of components described in the embodiment are not intended to limit the scope of the present invention only to them unless otherwise described explicitly.

First Embodiment

With reference to FIGS. 1 to 6, a sliding component according to a first embodiment of the present invention will be described.

The following describes the embodiment with a mechanical seal that is an example of the sliding component, as an example. The outer peripheral side of sliding parts constituting the mechanical seal is described as the sealed fluid side, and the inner peripheral side as the opposite-to-sealed-fluid side (atmosphere side). However, the present invention is not limited to this, and is also applicable to a case where the sealed fluid side and the opposite-to-sealed-fluid side (atmosphere side) are reversed.

Figure 1:
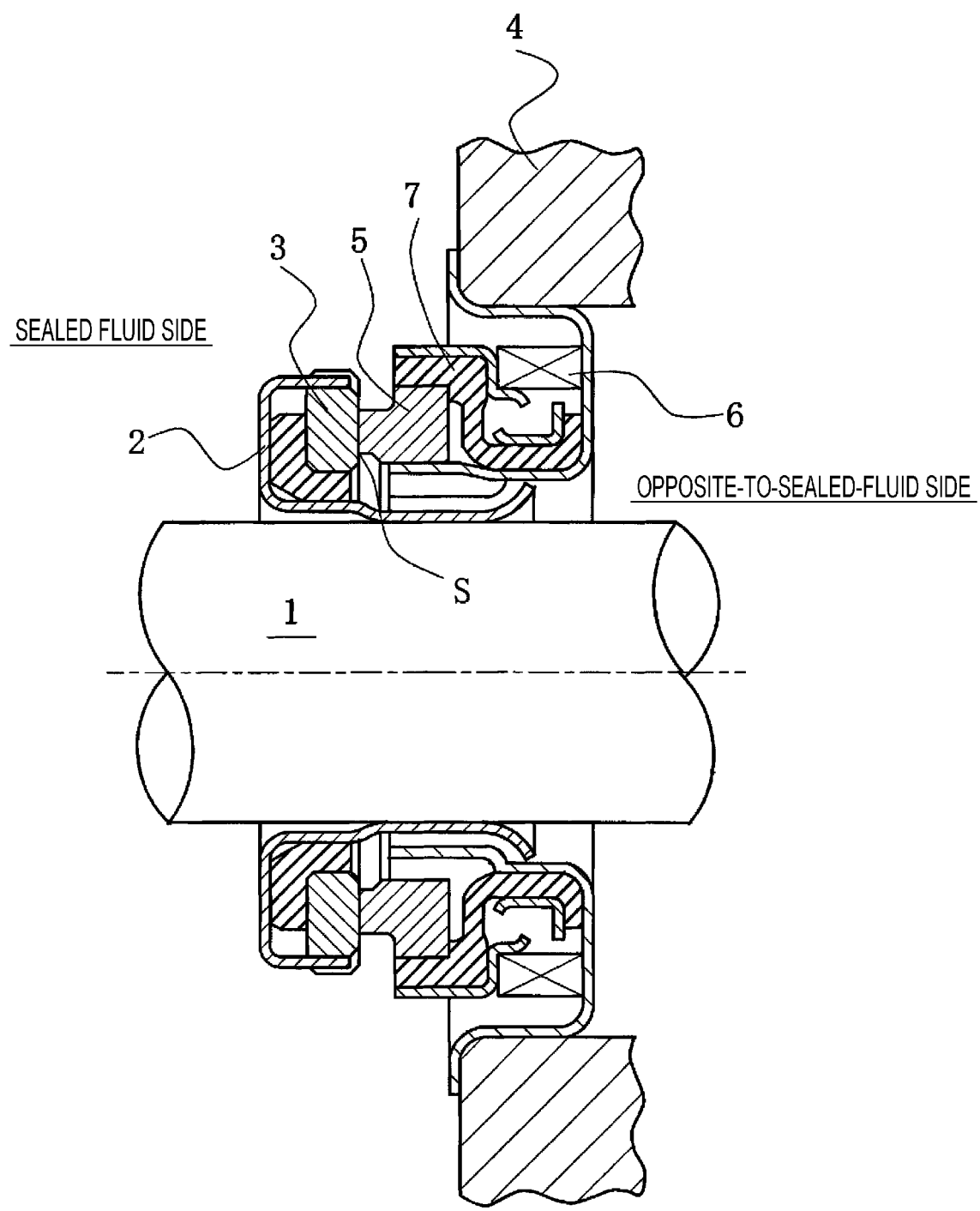
FIG. 1 is a vertical cross-sectional view showing an example of a mechanical seal according to a first embodiment of the present invention.

FIG. 1 is a vertical cross-sectional view showing an example of the mechanical seal, which is an inside mechanical seal in the form of sealing a sealed fluid on the sealed fluid side that tends to leak from the outer periphery toward the inner periphery of a sliding face. The mechanical seal is provided with an annular rotating-side seal ring 3 that is one sliding part provided via a sleeve 2 at a rotating shaft 1 to drive a pump impeller (not shown) on the sealed fluid side, in the state of being integrally rotatable with the rotating shaft 1, and an annular stationary-side seal ring 5 that is the other sliding part provided at a pump housing 4 in non-rotating and axially movable states. With a coiled wave spring 6 and a bellows 7 both axially biasing the stationary-side seal ring 5, the rotating-side seal ring 3 and the stationary-side seal ring 5 slide in close contact on each other's sliding faces S mirror-finished by lapping or the like. That is, the mechanical seal prevents, at each other's sliding faces S of the rotating-side seal ring 3 and the stationary-side seal ring 5, the sealed fluid from flowing out from the outer periphery of the rotating shaft 1 into the atmosphere side.

Figure 2:
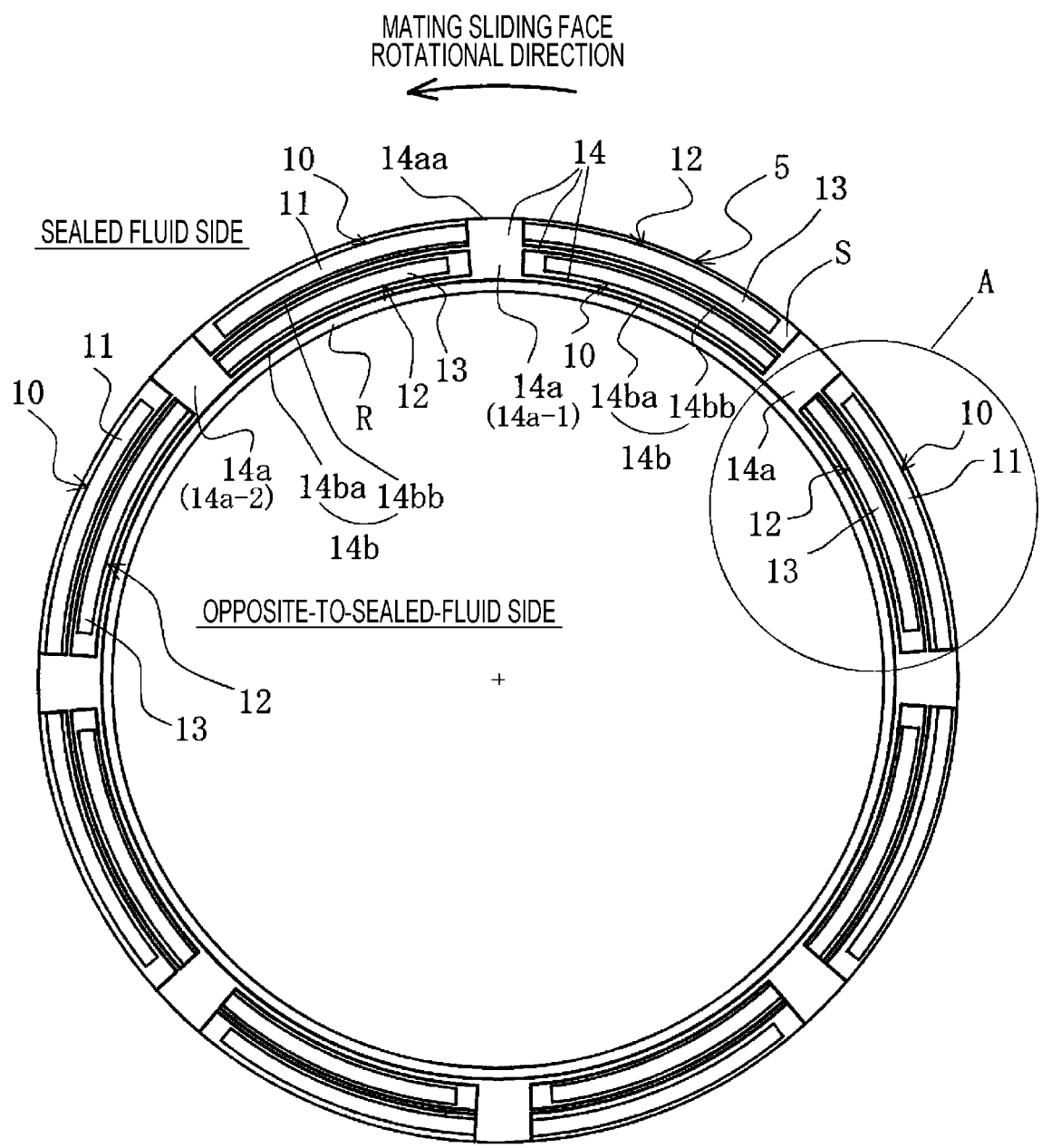
FIG. 2 is a plan view showing a sliding face of a sliding part according to the first embodiment of the present invention.

FIG. 2 shows a sliding face of a sliding part according to the first embodiment of the present invention. Here, a case where the present invention is applied to the sliding face of the stationary-side seal ring 5 in FIG. 2 will be described as an example.

A case where the present invention is applied to the sliding face of the rotating-side seal ring 3 is basically the same as the case to be described. However, in that case, radius-direction grooves only need to communicate with the sealed fluid side, and thus do not need to be extended to the outer peripheral side of the sliding face.

The description is based on the assumption that in FIG. 2, the outer peripheral side of the sliding face of the stationary-side seal ring 5 is the sealed fluid side, the inner peripheral side is the opposite-to-sealed-fluid side (atmosphere side), and the mating sliding face rotates in a counterclockwise direction.

On the sliding face S of the stationary-side seal ring 5, eight positive pressure generation mechanisms 10 each with a positive pressure generation groove 11 and eight negative pressure generation mechanisms 12 each with a negative pressure generation groove 13 are arranged. These are separated from the opposite-to-sealed-fluid side by a land R (sealing face).

The land R refers to a smooth portion of the sliding face S.

At least on the opposite-to-sealed-fluid side of the positive pressure generation grooves 11 and the negative pressure generation grooves 13, deep grooves 14 are provided in such a manner as to be separated from the opposite-to-sealed-fluid side by the land R.

Figure 3A:
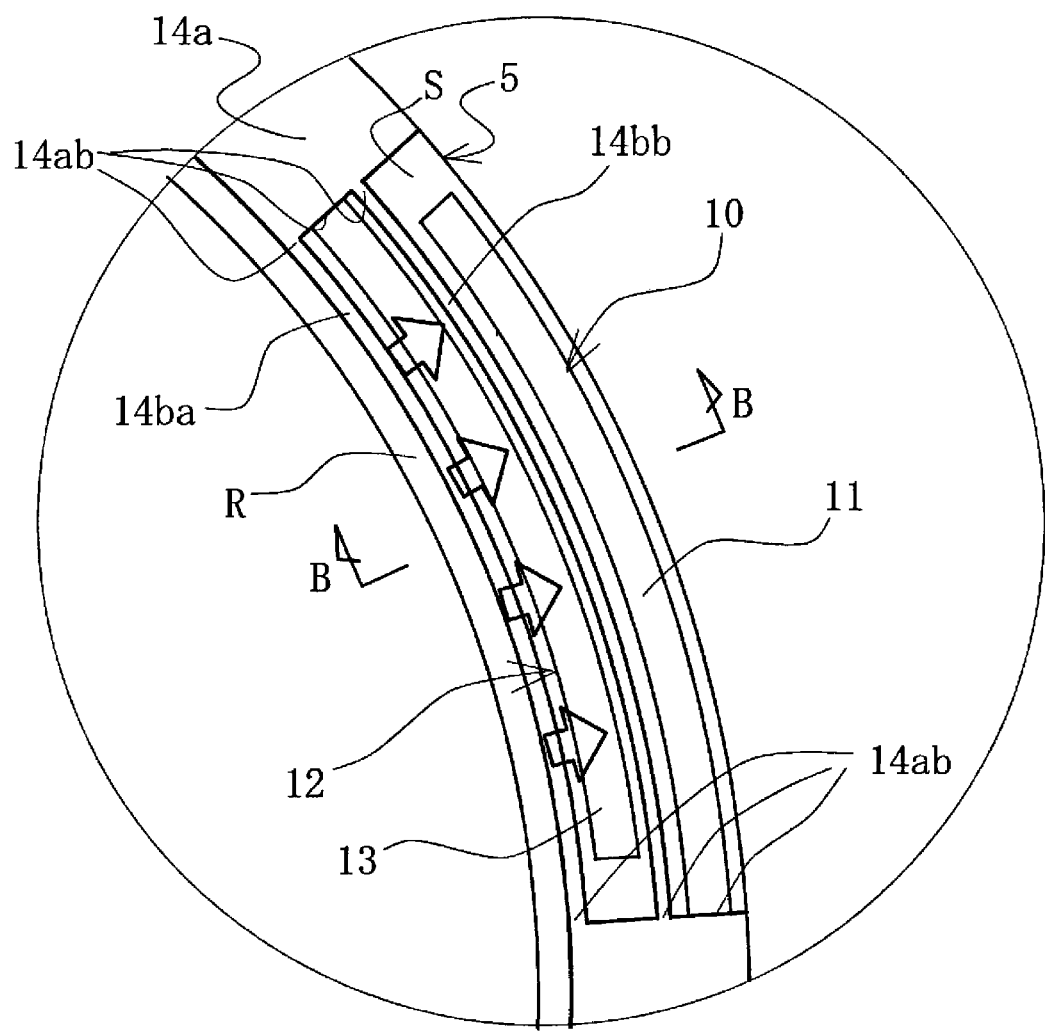
FIG. 3A is an enlarged view of a portion A in FIG. 2.
Figure 3B:
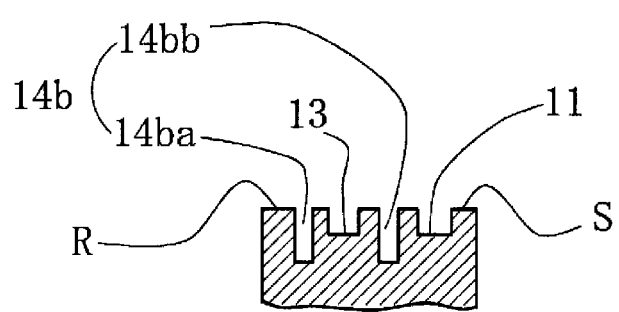
FIG. 3B is a cross-sectional view taken along line B-B in FIG. 3A.

As shown in FIG. 3B, the groove depth of the deep grooves 14 is deeper than the groove depth of the positive pressure generation grooves 11 and the negative pressure generation grooves 13.

As shown in FIG. 2, the deep grooves 14 include eight radius-direction grooves 14a and circumferential grooves 14b.

In the present example, the circumferential grooves 14b are arranged circumferentially continuously through the eight radius-direction grooves 14a.

The upstream ends of the positive pressure generation grooves 11 and the downstream ends of the negative pressure generation grooves 13 are provided in such a manner as to communicate with the sealed fluid side through the radius-direction grooves 14a.

In the example of FIG. 2, on the sealed fluid side of the sliding face, on opposite sides of one radius-direction groove 14a-1, the positive pressure generation groove 11 is provided downstream and the negative pressure generation groove 13 is provided upstream in such a manner as to communicate with the radius-direction groove 14a-1, and the eight positive pressure generation grooves 11 and negative pressure generation grooves 13 are evenly spaced circumferentially intermittently to extend in an arc shape. On the opposite-to-sealed-fluid side of the sliding face, on opposite sides of the next radius-direction groove 14a-2, the positive pressure generation groove 11 is provided downstream and the negative pressure generation groove 13 is provided upstream in such a manner as to communicate with the radius-direction groove 14a-2, and the eight positive pressure generation grooves 11 and negative pressure generation grooves 13 are evenly spaced circumferentially intermittently to extend in an arc shape.

That is, the upstream ends of the positive pressure generation grooves 11 and the downstream ends of the negative pressure generation grooves 13 need to be connected to the radius-direction grooves 14a, individually, and thus are arranged circumferentially alternately.

For example, with a portion A as a starting point for explanation, the positive pressure generation groove 11 is provided on the sealed fluid side in the portion A, and the negative pressure generation groove 13 is on the opposite-to-sealed-fluid side. The positive pressure generation grooves 11 and the negative pressure generation grooves 13 are arranged in such a manner as to alternate circumferential positions in sequence toward the downstream side.

Even if the rotational direction of the mating sliding face is in a clockwise direction opposite to the counterclockwise direction shown by the arrow, the form of arrangement of the positive pressure generation grooves 11, the negative pressure generation grooves 13, and the deep grooves 14 as shown in FIG. 2, where the positive pressure generation grooves 11 and the negative pressure generation grooves 13 are arranged circumferentially alternately in sequence, can have the same functions as the sliding part, and thus is suitable for apparatuses that rotate in both directions.

Note that the positive pressure generation grooves 11 and the negative pressure generation grooves 13 are not limited to the arrangement in the radial direction of the sliding face as shown in FIG. 2 in which they are arranged circumferentially alternately. The positive pressure generation grooves 11 may be arranged on the sealed fluid side (radially outer side), and the negative pressure generation grooves 13 on the opposite-to-sealed-fluid side (radially inner side).

In this case, positive pressure is generated over the entire circumference on the radially outer side, and negative pressure is generated over the entire circumference on the radially inner side. Thus, leakage can be reduced, but this arrangement can be applied only to apparatuses that rotate in one direction.

Further, at least one positive pressure generation groove 11 and at least one negative pressure generation groove 13 may be provided on the sliding face. An appropriate number of radius-direction grooves 14a are provided depending on the number of the positive pressure generation grooves 11 and the negative pressure generation grooves 13.

In the example of FIG. 2, the circumferential grooves 14*b* include opposite-to-sealed-fluid-side circumferential grooves 14*ba* arranged on the opposite-to-sealed-fluid side of the positive pressure generation grooves 11 and the negative pressure generation grooves 13, and intermediate circumferential grooves 14*bb* arranged in a radial direction space between the positive pressure generation grooves 11 and the negative pressure generation grooves 13.

Further, in the example of FIG. 2, each positive pressure generation mechanism 10 is formed of a Rayleigh step mechanism, and each negative pressure generation mechanism 12 is formed of a reversed Rayleigh step mechanism. The Rayleigh step mechanism includes a Rayleigh step groove 11 (positive pressure generation groove 11), and the reversed Rayleigh step mechanism includes a reversed Rayleigh step groove 13 (negative pressure generation groove 13).

Each negative pressure generation groove is not limited to the reversed Rayleigh step groove 13, and may be a pumping groove (a recess extending in the circumferential direction). In this case, the pumping groove does not need to be connected to the deep grooves 14.

The Rayleigh step mechanism and the reversed Rayleigh step mechanism will be described in detail later.

Each radius-direction groove 14*a* includes an inlet portion 14*aa* communicating with the sealed fluid side, and communicating portions 14*ab* communicating with the upstream end of the Rayleigh step groove 11, the downstream end of the reversed Rayleigh step groove 13, the intermediate circumferential grooves 14*bb*, and the opposite-to-sealed-fluid-side circumferential grooves 14*ba*, and has a substantially rectangular planar shape in the example of FIG. 2.

The planar shape of each radius-direction groove 14*a* is not limited to the substantially rectangular shape, and may be, for example, substantially a fan shape in which the inlet portion 14*aa* is large and the opposite-to-sealed-fluid side is small, to facilitate entry of fluid from the sealed fluid side.

Each positive pressure generation mechanism 10 sucks fluid from the sealed fluid side through the communicating portion 14*ab* of the radius-direction groove 14*a* at the upstream end thereof, generates a positive pressure, widens a gap between the sliding faces sliding relatively by the generated positive pressure, forms a liquid film between the sliding faces, and thereby improves lubricity.

Each negative pressure generation mechanism 12 generates a negative pressure at the upstream end, causes resulting cavitation, causes fluid to flow into the negative pressure generation mechanism 12 as shown by arrows in FIG. 3A since a cavitation internal pressure is a negative pressure lower than atmospheric pressure, generates resulting suction on the opposite-to-sealed-fluid side of the sliding face, and thereby prevents leakage from the sealed fluid side to the opposite-to-sealed-fluid side. The fluid sucked into the negative pressure generation mechanism 12 is discharged at the downstream end thereof to the sealed fluid side through the radius-direction groove 14*a* connected to the sealed fluid side.

The deep grooves 14 guide the sealed fluid on the sealed fluid side to nearly the entire surface of the sliding face S including a portion on the opposite-to-sealed-fluid side, and thereby prevent wear, burn-damage, and the like due to friction heating between the sliding faces.

That is, the opposite-to-sealed-fluid-side circumferential grooves 14*ba* of the deep grooves 14 serve to guide fluid that tends to leak from the sealed fluid side to the opposite-to-sealed-fluid side of the sliding face S, and release the fluid to the sealed fluid side through the radius-direction grooves 14.

The intermediate circumferential grooves 14*bb* of the deep grooves 14 serve to release dynamic pressure (positive pressure) generated at the positive pressure generation mechanisms 10, for example, the Rayleigh step mechanisms to the pressure of high pressure-side fluid, thereby preventing fluid from flowing into the negative pressure generation mechanisms 12 on the low-pressure side, for example, the reversed Rayleigh step mechanisms and weakening the negative pressure generation capacity of the negative pressure generation mechanisms 12, and serve to guide, to the intermediate circumferential grooves 14*bb*, fluid that tends to flow into the opposite-to-sealed-fluid side due to pressure generated at the positive pressure generation mechanisms 10 on the high-pressure side, and release the fluid to the sealed fluid side through the radius-direction grooves 14.

The depths and the widths of the Rayleigh step grooves 11, the reversed Rayleigh step grooves 13, and the deep grooves are determined suitably according to the diameter of the sliding part, the sliding face width, relative movement speed, sealing and lubrication conditions, and so on.

As an example, when the diameter of the sliding part is about 20 mm, and the sliding face width is about 2 mm, the width of the positive pressure generation grooves 11 and the negative pressure generation grooves 13 is 0.4 mm to 0.6 mm, the depth is some micrometers, and the width of the land R on the inner peripheral side is 0.2 mm to 0.4 mm. The depth of the deep grooves 14 is some tens of micrometers to some hundreds of micrometers.

Here, with reference to FIGS. 4A and 4B, a positive pressure generation mechanism formed of a Rayleigh step mechanism or the like, and a negative pressure generation mechanism formed of a reversed Rayleigh step mechanism or the like will be described.

In FIG. 4A, the rotating-side seal ring 3, an opposing sliding part, and the stationary-side seal ring 5 slide relatively as shown by arrows. For example, on the sliding face of the stationary-side seal ring 5, a Rayleigh step 11*a* is formed perpendicularly to a relative movement direction, facing upstream, and a groove 11 constituting a positive pressure generation groove is formed upstream of the Rayleigh step 11*a*. The sliding face of the opposing rotating-side seal ring 3 and the stationary-side seal ring 5 is flat.

When the rotating-side seal ring 3 and the stationary-side seal ring 5 relatively move in directions shown by the arrows, fluid intervening between the sliding faces of the rotating-side seal ring 3 and the stationary-side seal ring 5 tends to follow and move in the movement direction of the rotating-side seal ring 3 or the stationary-side seal ring 5 due to its viscosity. Consequently, at that time, a positive pressure (dynamic pressure) as shown by broken lines is generated by the presence of the Rayleigh step 11*a*.

Note that reference numerals 15*a* and 15*b* denote an inlet portion and an outlet portion of the radius-direction grooves 15, and R a land constituting the sealing face S.

Also in FIG. 4B, the rotating-side seal ring 3, the opposing sliding part, and the stationary-side seal ring 5 relatively slide as shown by arrows. On the sliding face of the rotating-side seal ring 3 and the stationary-side seal ring 5, a reversed Rayleigh step 13*a* is formed perpendicularly to a relative movement direction, facing downstream, and a groove 13 constituting a negative pressure generation groove is formed downstream of the reversed Rayleigh step 13*a*. The sliding face of the opposing rotating-side seal ring 3 and the stationary-side seal ring 5 is flat.

When the rotating-side seal ring 3 and the stationary-side seal ring 5 relatively move in directions shown by the arrows, fluid intervening between the sliding faces of the rotating-side seal ring 3 and the stationary-side seal ring 5 tends to follow and move in the movement direction of the rotating-side seal ring 3 or the stationary-side seal ring 5 due to its viscosity. Consequently, at that time, a negative pressure (dynamic pressure) as shown by broken lines is generated by the presence of the reversed Rayleigh step 13a.

Note that reference numeral 14a denotes a radius-direction groove, and R a land constituting the sealing face S.

Next, with reference to FIG. 5, the relationship between the number of revolutions and a minimum liquid film in the sliding component according to the first embodiment of the present invention will be described. The minimum liquid film means a liquid film portion of a minimum thickness of a liquid film formed on the entire sliding face, and corresponds to a liquid film portion on the sliding face on the opposite-to-sealed-fluid side.

Figure 5:
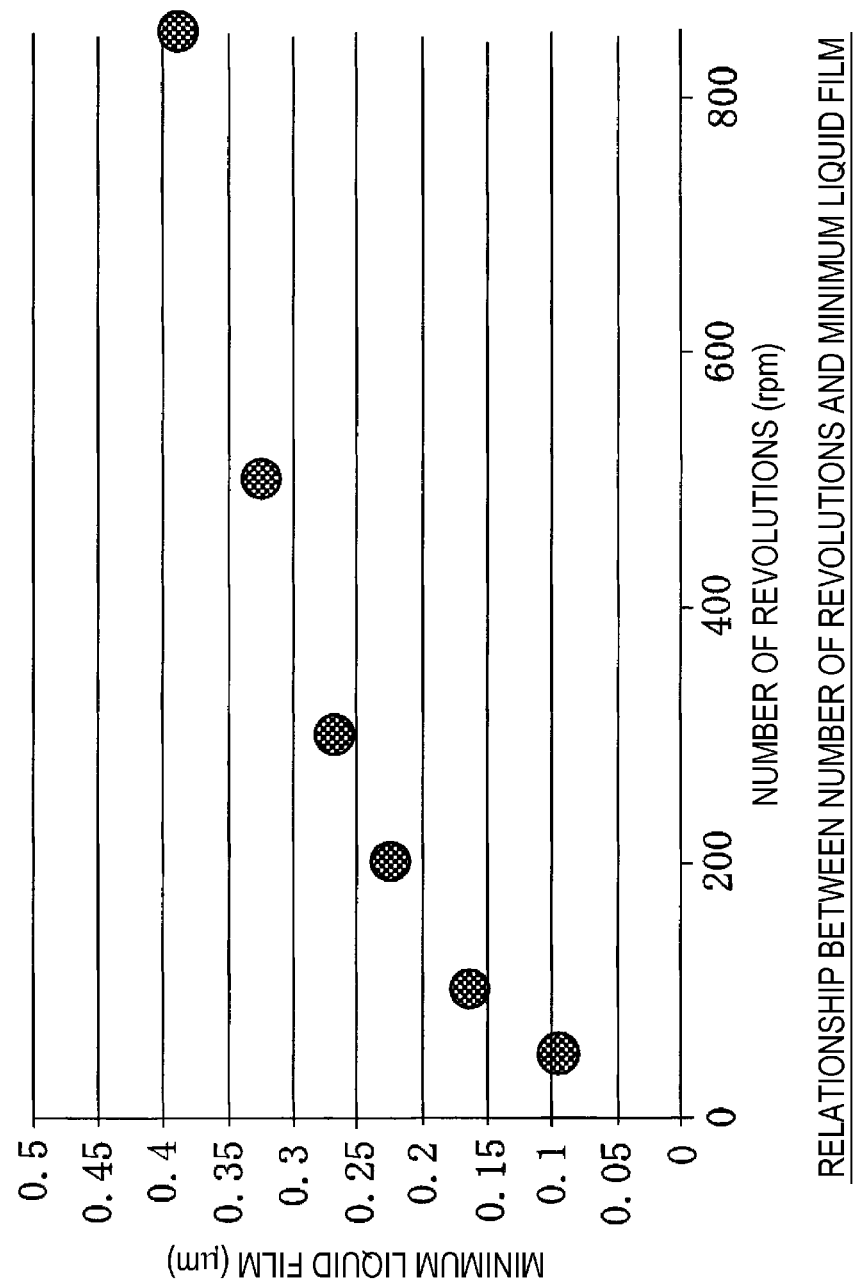
FIG. 5 is a graph showing the relationship between the number of revolutions and a minimum liquid film in a sliding component according to the first embodiment of the present invention.
Figures 7A, 7B:
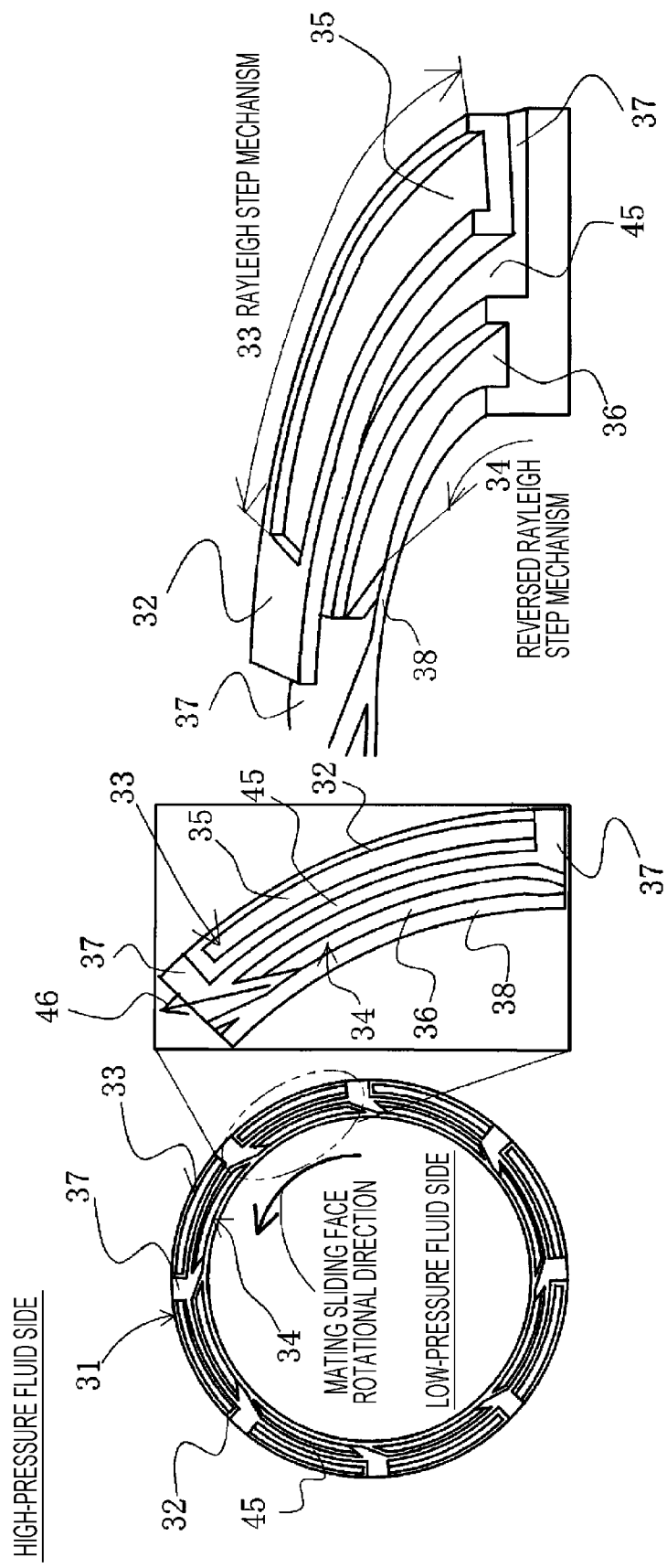
FIGS. 7A and 7B are diagrams explaining the conventional art.

In FIG. 5, the minimum liquid film thickness is 0.1 μm at a number of revolutions of about 50 rpm, and tends to increase rapidly with increase in the number of revolutions up to a number of revolutions of 300 rpm, and thereafter increase gradually. At a number of revolutions of about 800 rpm, the minimum liquid film thickness is about 0.38 μm.

Results in FIG. 5 show that in the sliding component according to the first embodiment of the present invention, a liquid film is formed from a stage where the number of revolutions is relatively small on the sliding face on the opposite-to-sealed-fluid side where a minimum liquid film is formed, and the degree of increase is small at a number of revolutions of about 500 rpm to about 800 rpm. That is, it is shown that a liquid film is formed on the sliding face on the opposite-to-sealed-fluid side even in the early stages of rotation, producing a lubrication state on the entire sliding face, and that the liquid film thickness is kept nearly constant even when the number of revolutions is increased, and leakage to the opposite-to-sealed-fluid side is small.

Next, with reference to FIG. 6, the relationship between the number of revolutions and the flow rate at the sliding face on the opposite-to-sealed-fluid side in the sliding component according to the first embodiment of the present invention will be described.

In FIG. 6, the flow rate on the opposite-to-sealed-fluid side is small at a number of revolutions of less than about 100 rpm.

When the number of revolutions exceeds about 100 rpm, the flow rate on the opposite-to-sealed-fluid side increases, and up to 800 rpm, it increases nearly linearly.

The flow rate of fluid at the sliding face on the opposite-to-sealed-fluid side is closely related to the flow rate of fluid supplied from the sealed fluid side through the deep grooves 14. In particular, the presence of the negative pressure generation mechanisms 12 on the sliding face on the opposite-to-sealed-fluid side generates suction (pumping) on the opposite-to-sealed-fluid side of the sliding face as shown in FIG. 3A, so that the flow rate increases as the suction (pumping) of the negative pressure generation mechanisms 12 increases.

Results in FIG. 6 show that in the sliding component according to the first embodiment of the present invention, since the flow rate on the opposite-to-sealed-fluid side increases with increase in the number of revolutions, fluid is supplied from the sealed fluid side to the opposite-to-sealed-fluid side through the deep grooves 14, and suction (pumping) by the negative pressure generation mechanisms 12 provided on the sliding face on the opposite-to-sealed-fluid side acts effectively. This can provide a good lubrication state of the sliding faces while preventing leakage.

The sliding component according to the first embodiment of the present invention is as described above, and has the following outstanding effects.

(1) The deep grooves 14 deeper than the groove depth of the positive pressure generation grooves 11 and the negative pressure generation grooves 13 are located at least on the opposite-to-sealed-fluid side of the positive pressure generation grooves 11 and the negative pressure generation grooves 13. The deep grooves 14 are provided in such a manner as to communicate with the upstream ends of the positive pressure generation grooves 11, the downstream ends of the negative pressure generation grooves 13, and the sealed fluid side, thereby actively taking in fluid to the entire sliding face, preventing a liquid film between the sliding faces from running out, and improving low torque, low wear, and resistance to the adhesion of sealed fluid molten material while preventing leakage. Consequently, a sliding component that can maintain the sealing function of the sliding faces for a long time can be provided.

(2) The deep grooves 14 include the radius-direction grooves 14a and the circumferential grooves 14b, so that the positive pressure generation grooves 11 and the negative pressure generation grooves 13 can be arranged efficiently on the sliding face, and fluid can be effectively taken into the entire sliding face.

(3) The positive pressure generation grooves 11 and the negative pressure generation grooves 13 are arranged circumferentially intermittently to extend in an arc shape on opposite sides of the radius-direction grooves 14a. The circumferential grooves 14b are arranged circumferentially continuously through the radius-direction grooves 14a. Consequently, even when a plurality of positive pressure generation grooves 11 and a plurality of negative pressure generation grooves 13 are provided, the positive pressure generation grooves 11 and the negative pressure generation grooves 13 can be arranged efficiently on the sliding face, and fluid can be effectively taken into the entire sliding face.

(4) Each positive pressure generation groove 11 is formed of a Rayleigh step groove, and each negative pressure generation groove 13 is formed of a reversed Rayleigh step groove or a pumping groove, so that positive pressure and negative pressure can be generated efficiently at the sliding face.

(5) The positive pressure generation grooves 11 or the negative pressure generation grooves 13 are radially spaced in a plurality of rows, and the circumferential grooves 14b are arranged on the opposite-to-sealed-fluid side of the positive pressure generation grooves 11 or the negative pressure generation grooves 13, and in the radial direction space between the positive pressure generation grooves 11 and the negative pressure generation grooves 13, so that positive pressure and negative pressure can be generated effectively at the entire sliding face, and fluid can be effectively taken into the entire sliding face.

Although the embodiment of the present invention has been described above with reference to the drawings, a specific configuration thereof is not limited to the embodiment. Any changes and additions made thereto without departing from the scope of the present invention are included in the present invention.

For example, the embodiment has described a case where a sliding part is used as one of a pair of rotating seal ring and stationary seal ring in a mechanical seal device. The sliding part can also be used as a bearing sliding part that slides on a rotating shaft while sealing lubricating oil on one radial side of a cylindrical sliding face.

Further, for example, the embodiment has described a case where a high-pressure sealed fluid is present on the outer peripheral side. The present invention is also applicable to a case where a high-pressure fluid is on the inner peripheral side.

Further, for example, the embodiment has described a case where positive pressure generation mechanisms, negative pressure generation mechanisms, and deep grooves are provided on a stationary-side seal ring of a mechanical seal constituting a sliding component. Conversely, they may be provided on a rotating-side seal ring.

Further, for example, positive pressure generation mechanisms may be provided on one sliding ring, and negative pressure generation mechanisms on the other sliding ring, and deep grooves may be provided on one of the sliding rings.

Further, for example, the embodiment has described an example where eight Rayleigh steps constituting positive pressure generation mechanisms are provided, and eight reversed Rayleigh steps constituting negative pressure generation mechanisms are provided. The numbers of them are not limited to this, and may be smaller than this, e.g. four, or may be larger than this, e.g. twelve.

The invention claimed is:

1. A sliding component comprising:
a pair of sliding parts of annular shapes, the sliding parts having respective sliding faces sliding relatively to each other, at least one of the sliding faces being provided with a positive pressure generation mechanism with a positive pressure generation groove, a negative pressure generation mechanism with a negative pressure generation groove, a land, and a deep groove,
wherein the land separates the positive pressure generation groove and the negative pressure generation groove from an opposite-to-sealed-fluid side,
wherein the deep groove is deeper than a groove depth of the positive pressure generation groove and the negative pressure generation groove, and includes a radius-direction groove and a circumferential groove,
wherein the radius-direction groove has an inlet portion communicating with a sealed fluid side, the circumferential groove has communicating portions communicating with the radius-direction groove at each end, and
wherein the positive pressure generation groove or the negative pressure generation groove is radially spaced in a plurality of rows, and the circumferential grooves are arranged on the opposite-to-sealed-fluid side of each of the positive pressure generating groove and the negative pressure generating groove, and in a radial direction space between the positive pressure generation groove and the negative pressure generation groove.

2. The sliding component according to claim 1, wherein the positive pressure generation groove and the negative pressure generation groove are arranged on opposite sides of the radius-direction groove circumferentially intermittently to extend in an arc shape, and the circumferential grooves are arranged circumferentially continuously through the radius-direction groove.

3. The sliding component according to claim 1, wherein the positive pressure generation groove is formed of a Rayleigh step groove, and the negative pressure generation groove is formed of a reversed Rayleigh step groove or a pumping groove.

4. The sliding component according to claim 2, wherein the positive pressure generation groove is formed of a Rayleigh step groove, and the negative pressure generation groove is formed of a reversed Rayleigh step groove or a pumping groove.

* * * * *